INVENTOR.
WILLIAM M. GOLDBERGER
BY GRAY, MASE & DUNSON
ATTORNEYS

INVENTOR.
WILLIAM M. GOLDBERGER
BY GRAY, MASE & DUNSON
ATTORNEYS

United States Patent Office 3,404,078
Patented Oct. 1, 1968

3,404,078
METHOD OF GENERATING A PLASMA ARC WITH A FLUIDIZED BED AS ONE ELECTRODE
William M. Goldberger, Columbus, Ohio, assignor, by mesne assignments, to The Battelle Development Corporation, Columbus, Ohio, a corporation of Delaware
Continuation-in-part of application Ser. No. 389,268, Aug. 13, 1964. This application May 25, 1965, Ser. No. 467,160
7 Claims. (Cl. 204—164)

ABSTRACT OF THE DISCLOSURE

A method for exposing materials to the high temperature of a plasma arc and cooling the resulting heated products by intimate contact with a fluidized bed of particles comprising; establishing a fluidized bed of electrically conductive particles, positioning an electrode contiguous to said bed, establishing a continuous stable arc between said bed and said electrode and introducing said materials into the high-temperature zone of said arc so that the resulting heated products pass from said zone into said fluidized bed.

---

This invention relates to an improved method and apparatus for generating plasma arcs. In particular it deals with a plasma arc generator and method in which the fluidized bed serves as one electrode.

This application is a continuation-in-part of my United States patent application Ser. No. 389,268 filed Aug. 13, 1964, entitled "Plasma," now abandoned.

The use of fluidized solids in direct contact with ionized gases (otherwise known as plasmas, plasma flames, plasma jets and plasma arms) offers advantages for conducting numerous high temperature chemical processes. For example, high melting point elements and compounds may be coated into solid particles by melting and vaporizing the coating material in a plasma jet then contacting the particles; while fluidized, with the plasma containing the coating material. The coating material then condenses and solidifies on the surfaces of the particles to form the desired coating. In addition to coating processes, the direct contact of a plasma with fluidized particles can provide rapid and controlled cooling of the products of chemical reactions which occur within the plasma. Another application is the use of a bed of fluidized solids to agglomerate or filter out the solids which may be formed by the reactions which can occur in plasmas and thereby aid in their recovery or prevent erosion or fouling of subsequent processing equipment.

The methods of contacting a bed of fluidized solid particles with a plasma which have been described in the literature and in the prior art involve the coupling of a plasma generator to a vessel containing a bed of fluidized solids in a manner similar to that used to attach a conventional fuel burner to a fluidized bed for the purpose of injecting a combustion flame into the fluidized bed. As with the combustion flame, the plasma flame may be made to contact the particles of the fluidized bed by either injecting the plasma below the upper level of the fluidized bed or by directing the plasma downward to impinge on the upper surface of the fluidized bed. In past practice, the plasma generator has been a separate and complete electrical system comprising an electrode cathode and an anode which are isolated from direct electrical contact with the solid particles of the fluidized bed.

There are inherent problems with the prior methods of generating plasmas and contacting them with fluidized particles that detract from the economic advantages that may be offered by this general technique for commercial chemical processing. For example, when it is desired to maintain a fixed electrode configuration, the electrodes must be cooled to prevent excessive loss of electrode material due to melting and vaporization. Cooling is most conveniently accomplished by surface heat exchange to a stream of cooling water but this results in a loss of energy efficiency. Energy losses in the conventional plasma generator are usually more than 25 percent of the total electrical input. A major part of this loss occurs at the anode and along the passage through which the plasma flame passes in traveling from the separate plasma generator to the bed of fluidized solids. Other problems with the prior art methods of using a separate plasma generator relate to low chemical efficiency and poor operability with processes which involve introducing reactive components into the plasma. Such reactive components when introduced into the prior art plasma generators with the plasma-forming gas subject the generator and the electrodes to chemical attack. Solids introduced in this manner also subject the prior art generators to erosion, plugging and stoppage of the gas flow because the solids tend to melt and stick to the generator parts. This action can also cause electrical short-circuiting. From the standpoint of operability, it is best to introduce reactive components and solids into the prior art plasma generators at a point downstream from the plasma arc formation region. A secondary stream of gas is generally required to convey any solid components into the plasma that are formed by the methods of the prior art. The heat absorbed from the plasma by this secondary gas reduces the heat available to the solid components and can represent a further loss in energy efficiency. In addition, it is not possible to achieve a uniform dispersion of solids into the plasma because of the short residence times involved and a significant portion of the solids may be ejected from the plasma without first being transformed in the desired way.

It is an object of this invention to generate a plasma arc of high electrical input efficiency.

It is still another objective of this invention to generate a plasma arc in direct contact with fluidized solid particles in a manner which eliminates the need to transfer the plasma from a separate plasma generator through a transfer pipe into the bed of fluidized solids.

It is another object of this invention to introduce reactive components into the arc formation zone of a plasma generator without subjecting the plasma generator to detrimental chemical attack.

It is yet another objective of this invention to introduce reactive solid components into the arc formation zone of a plasma generator without causing plugging and short circuiting of the arc circuit.

It is a further objective of this invention to produce a plasma arc that is substantially larger in arc cross-section than the conventional plasma torch arc of similar power input.

Other objects will be apparent from the following detailed description thereof.

Figure 1:
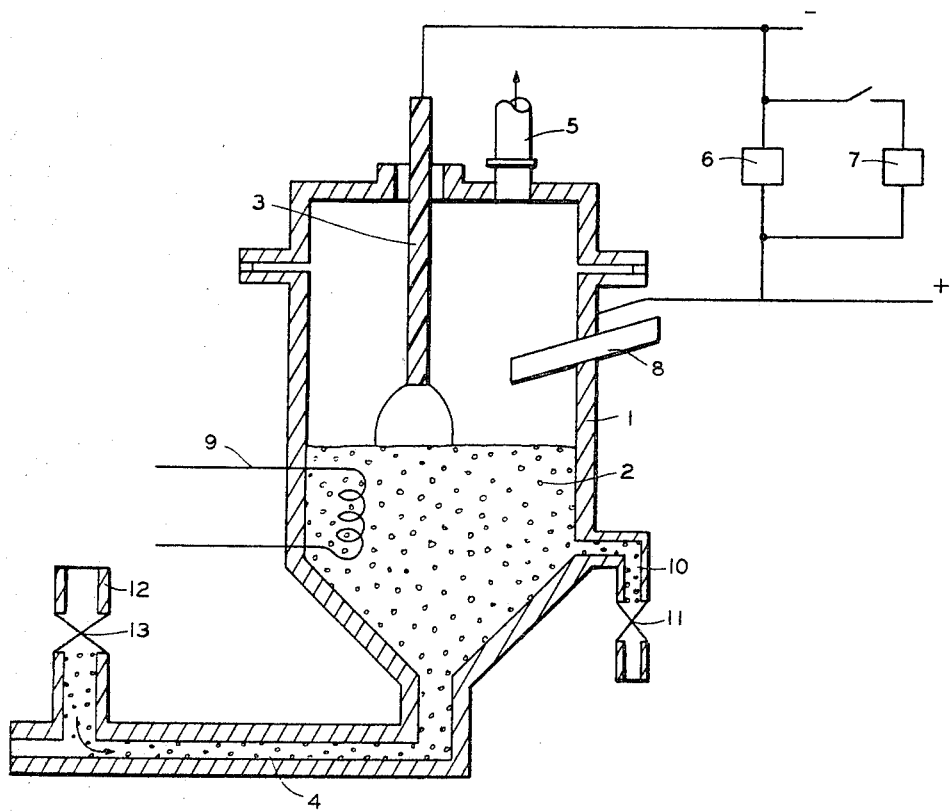
FIG. 1 is an illustrative cross-sectional view of an apparatus that falls within the scope of the present invention.

Referring now more specifically to the drawings it will be seen that a schematic diagram of the apparatus preferred for practicing this invention is shown in FIG. 1. Vessel 1 is designed to contain a fluidized bed of electrically conductive particles 2. As shown in FIG. 1, vessel 1 is itself made of an electrically conductive material and forms a part of the electrical circuit involved. An electrode 3 is supported in a vertical position along the vertical axis of vessel 1 and is positioned so that the lower end of the electrode 3 is not in direct physical contact with the dense bed of fluidized solids. Gas to fluidize the solids in vessel 1 is provided through gas inlet 4. After emerging from the fluidized bed, the fluidizing gas leaves the vessel through gas exit 5. A voltage source and electrical power supply 6 is provided to cause electric current to flow across the gas gap between electrode element 3 and the bed of fluidized solids 2. An auxiliary starter unit 7, which generates a high frequency alternating field, can be used in conjunction with the power source 6 to initiate an electric arc between electrode element 3 and fluidized bed 2 or the arc can be initiated by first immersing electrode 3 into the bed to obtain a direct electrical contact, then raising electrode 3 to produce a gap across which an electric arc can be maintained to form a plasma of the gas in the vicinity of the arc. Solids and other components may be introduced into the arc region through tube 8. Thus, in effect, fluidized bed 2 acts as one electrode of a plasma arc generator and the plasma is in direct and intimate contact with particles in the fluidized bed without being subject to energy losses due to passage through a transfer pipe. To maintain a desired temperature level in fluidized bed 2 it is necessary that heat be removed. Various heat removal methods may be employed such as transfer of heat to a coolant which flows through coils 9 or heat can be transferred outward through the walls of the vessel 1, or heat can be removed by withdrawing a portion of the solids from vessel 1 through solids outlet 10 either intermittently or continuously and removing by auxiliary means (not shown) a part of their heat content, then returning the cooled solids to the fluidized bed 2 through pipe 12 and solids flow control valve 13 into the fluidizing gas which conveys the cooled solids back into vessel 1. Valve 11 is provided to control the rate of withdrawal of the solids from vessel 1.

Figure 2:
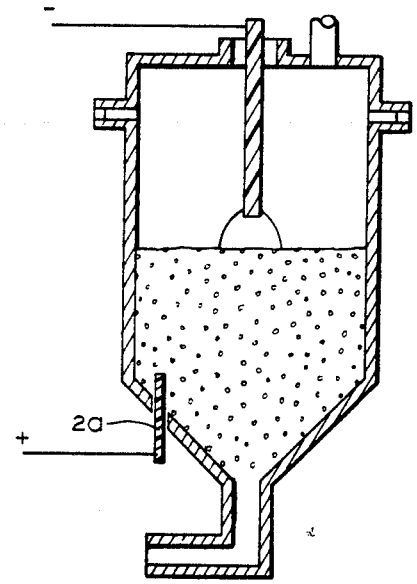
FIG. 2 is an illustrative cross-sectional view of an apparatus similar to that of FIG. 1 but having a second contact electrode disposed to complete the plasma arc circuit.

It is not a necessity that vessel 1 be made of electrically conductive material. The electrical path may be completed by providing a second electrode element 2A which may be immersed in the fluidized bed of conductive particles as shown in FIG. 2.

Figure 3:
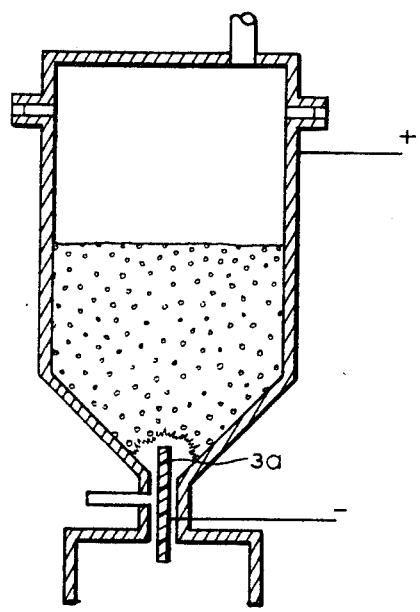
FIG. 3 is an illustrative cross-sectional view of a modified embodiment of the apparatus of FIG. 1 wherein a plasma arc is formed near the bottom of a fluidized bed.

Neither is it necessary that the electrode element be positioned above the upper surface of the fluidized bed. It is possible to position an electrode element 3A below the bed level (as shown in FIG. 3). By maintaining a suitable gas velocity in the vicinity of the electrode, one can prevent solids from making prolonged contact with the electrode. Thus, an arc gap can be established at the bottom of the vessel.

Figure 4:
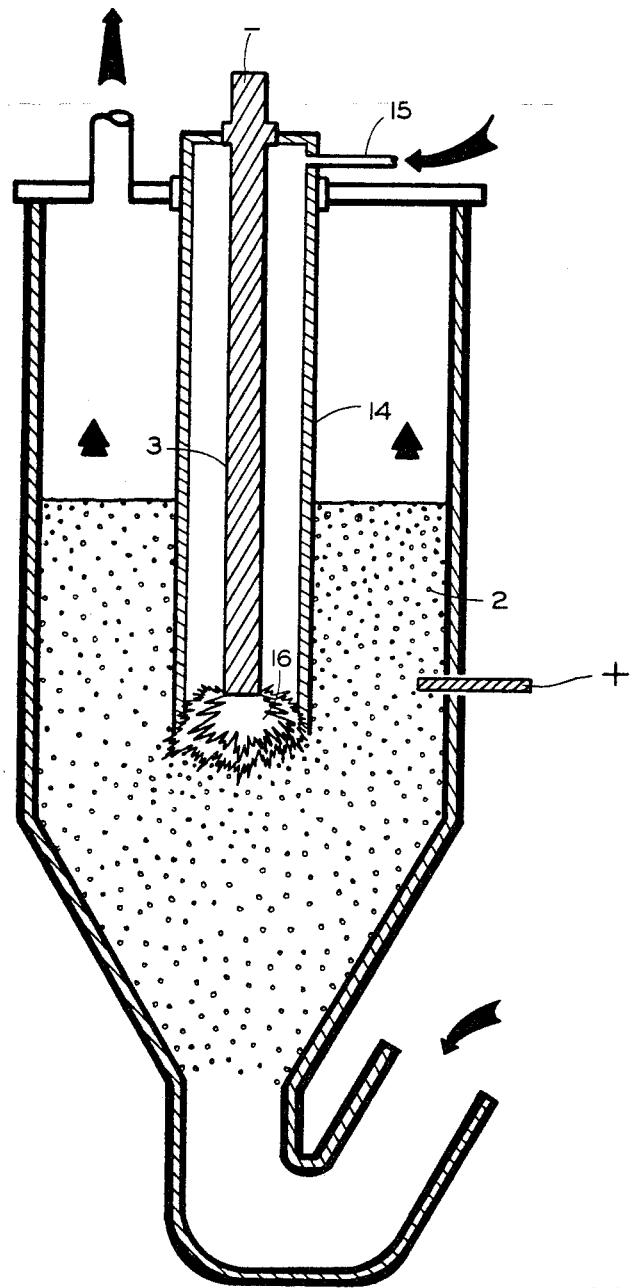
FIG. 4 is an illustrative cross-sectional view of an apparatus similar to that of FIG. 1 wherein the electrode is mounted within a tube which is immersed in a fluidized bed.

A particularly advantageous and efficient apparatus for use in conjunction with the method of the present invention is the embodiment illustrated by FIG. 4. In this embodiment electrode 3 is centrally mounted within a tube or sleeve 14. Sleeve 14 is enclosed at the top around the electrode 3 and is submerged at its lower end within the fluidized bed 2. A stream of gas, which may be the reactant and/or may be a carrier gas in which there is entrained particulate solids or liquids is introduced into sleeve 14 at the top through inlet 15. Such a gas flows, or is forced by gaseous pressure, downward through sleeve 14, around electrode 3 and out of the bottom of the tube into the fluidized bed. Because of the downward gaseous flow or the hydrodynamic forces involved, sleeve 14 remains essentially void of solids from the fluidized bed although the upper levels of the bed are substantially above the lower end of the sleeve 14. Electrode 3 is positioned slightly above the level of the fluidized bed particles at the bottom of sleeve 14 so that a plasma arc may be established in the zone 16. The gases flowing downwardly through sleeve 14 pass through arc zone 16 and into the fluidized bed so that intimate contact of the products of reaction with the fluidized bed particles is assured. Such gases pass upwardly and are removed from the fluidized-bed reactor in a conventional manner.

Conventional means (not shown) for removing heat from the fluidized bed may be provided so that particularly efficient quenching of gaseous reaction products can be established.

In the utilization of apparatus such as that illustrated by FIGS. 1 and 2, a portion of the gaseous reactants (or solids entrained in a gaseous current) introduced into the arc zone through tube 8 may pass from the fluidized bed reactor without sufficient intimate contact with either the high temperature arc zone or the fluidized bed so as to be completely reacted and/or quenched. It is obvious that the apparatus of FIG. 4 assures more intimate contact of the reactant gases introduced through entrance port 15 with the arc zone and the fluidized bed 2.

Sleeve or tube 14 must, of course, be constructed of a material that is capable of withstanding the environment of the fluidized bed and the high temperatures radiated by the arc zone. I have had particular success using Vycor tubes (temperature resistant silica glass) and graphite tubes; however, any appropriate heat-resistant material can be employed.

In each of the embodiments of FIGS. 1-4 electrodes 3 (or 3a) are preferably vertically positionable. Apparatus for vertically positioning such electrodes are well-known in the art and consequently are not shown or described in detail in this application. Since one electrode is a fluidized bed, the solid electrode may be immersed in the bed and withdrawn slowly to initiate the arc. In the case of the embodiment of FIG. 4 the electrode must be vertically positionable within sleeve 14.

A still further modified embodiment of the present invention includes the utilization of a hollow electrode. For instance, in the embodiments of FIGS. 1-3 electrode 3 (or 3a) may be hollow; and the reactants, instead of being introduced through a tube, such as tube 8, may be introduced through the hollow portion of the electrode. It will be appreciated that in many instances a more efficient and complete reaction may be effected by such construction.

Fluidized beds are not well defined bodies so that it is difficult to accurately space a solid electrode in respect to a bed. However, a plasma arc may always be established between the solid electrode and the bed even if the electrode is immersed in the bed since the bed is a mass of moving individual particles rather than a solid body and is thus in a sense spaced from the surface of the electrode. If the solid electrode is immersed in the fluidized bed and relatively low voltages are applied, an electric current will flow through the bed itself without the establishment of an arc. At higher voltages however arcing will occur between the surface of the immersed electrode and the surrounding conductive fluidized particles. Such an arc may be utilized to effect plasma arc reactions in accordance with the present invention. Electrode 3 of the apparatus of any of FIGS. 1-4 may be immersed in the respective fluidized bed of particles 2, and at sufficiently high voltages an arc may be established along the electrode surface to effect high temperature plasma arc reactions. Thus, although it is preferred to space the electrode from the bed, it may be said that the surface of the solid electrode must be contiguous with the bed of particles, the word contiguous being defined to include an electrode spaced from the bed; immediately adjacent (contiguous) to the bed and immersed within the bed.

As stated above, the fluidized-bed particles must be capable of carrying an electric current. Although I have found it to be expedient to employ graphite or carbon particles, other materials such as refractory metal particles may be preferred in some instances. Metal carbides such as calcium carbide may also be employed as the fluid-bed particles. Refractory metal oxides such as magnesia and alumina are ordinarily regarded as being non-conductive materials and generally cannot be utilized as the fluidized-bed particles in carrying out the process of the present invention. However, under conditions of high temperature and high voltage such materials are capable of carrying an electric current so that under special circumstances they may be utilized as the bed of particles either alone or in combination with other particulate material.

Such particles may be of any size capable of being fluidized but most generally will be of a particle size ranging from −8 to +325 mesh which is that of most commercially useful fluidized beds.

Broadly, this invention is a method of generating a plasma arc comprising the steps of maintaining a dense phase fluidized bed (fluidized by a gas) of electrically conductive particles within a fluidization vessel, positioning an electrode near the interface of the dense phase fluidized bed and the surrounding gas phase, and establishing a stable low voltage-high current electric arc between the electrode and the conductive particles of the fluidized bed.

By practicing this invention the user will create a larger arc zone than he would realize if he used a conventional gas stabilized plasma torch to produce a plasma arc. The constant movement of the fluidized bed causes the arc action to occur at widely separated arc paths which then allows the hot zone to be enlarged in contrast to the confined arc of the more usual plasma arc torch. The enlarged arc zone region provides a longer retention of the reactants fed into the arc zone than could be obtained in the plasma torch. This method of generating an arc between an electrode and a bed of fluidized solids enables the solids to come into direct contact with the arc without adversely affecting the stability of the arc or subjecting electrodes to erosion and chemical attack. In addition, this invention enables increased electrical energy efficiency by eliminating the need for cooling of electrodes and by providing convenient re-use of the heat values.

This invention employs a bed of electrically conductive fluidized particles as an integral electrical part of the plasma generator. This permits direct contact of the plasma with the fluidized particles. As a result, the plasma is not subject to energy losses which might otherwise occur. In the prior art, for example, the plasma is required to travel through a cooled passage connecting a separate plasma generator to the bed of fluidized solids.

Solid components can also be introduced into the arc formation region apparatus of this invention without causing plugging and short circuiting and without detrimetal effect to the control and stability of the process.

The process of this invention, because of a larger arc zone than in other processes, is very useful for producing various physical and chemical changes in materials that can be promoted by a plasma arc. The physical changes brought about in materials that are subjected to plasma arc exposure as practiced in this invention include such changes as vaporizing, agglomerating, coating, spheroidizing, fusion, solid phase transformation of materials and cracking of organic materals. By this invention the noted physical and chemical changes are made to occur in the plasma arc region. For conducting such changes, as possible by practicing this invention, the following process is executed in plasma generators similar to those illustrated in FIGS. 1, 2, and 3:

(1) Electrically conductive particles are introduced into a plasma generator.

(2) The particles are fluidized by a suitable gas which is compatible with the materials to be used in the process. Some of the typical gases which may be used are argon, helium, hydrogen, carbon monoxide, nitrogen and others depending on the desired results. Mixtures of one or more of these gases may be used.

(3) A plasma arc is established between an electrode and the fluidized bed of electrically conductive particles. Graphite or other forms of carbon particles are preferred for use as the electrically conductive particles. However, high temperature melting point refractory metal powders or their alloys may also be satisfactorily used as electrically conductive particles for the fluidized bed.

(4) The bed particles in the immediate region of the plasma arc can undergo chemical or physical changes if the conditions are tailored toward this objective. However, if it is desired to create physical or chemical changes in materials other than the bed materials, then it is necessary to add additional substances into the plasma arc generator. These reactive substances may be introduced into the arc region by a carrier gas or other physical means. The reactive substances thus introduced into the plasma arc generator can be a gas or mixture of gases or a solid or a mixture of solids and gases depending on what final product is sought.

(5) After the physical or chemical reaction of the reactive substances has occurred in the plasma arc region, the product or products of the physical or chemical change are removed from the apparatus.

The particular advantages resulting from the practice of this invention are:

(1) A larger arc zone than in a conventional plasma arc
(2) A longer retention period for reactants in the arc zone
(3) A prolonged useful life for the electrode used
(4) An increase in electrical energy efficiency
(5) The ability to feed solid components into the arc formation region without plugging and short-circuiting during the plasma arc operation.

The process of this invention has been used to produce elemental phosphorus and to produce calcium carbide. A furnace similar to that shown schematically in FIG. 1 was used to extract the phosphorus from tricalcium phosphate $Ca_3(PO_4)_2$ and to produce calcium carbide ($CaC_2$) from lime powder. The lime powder (CaO) which can be used in the process of this invention can contain a small percent of impurities such as magnesium oxide, ferric oxide, and other common impurities in very small amounts such as may be found in industrial or commercial grade lime (CaO). The following examples illustrate the process of this invention:

EXAMPLE 1

A feed consisting of 42.7 weight percent $Ca_3(PO_4)_2$, 24.9 weight percent $SiO_2$ and 32.4 weight percent graphite (C) of minus 200 mesh was blended with water for several hours. The water was then removed by evaporation and the residual cake was crushed to pass through a 100 mesh screen. This mixture was then conveyed with argon gas to the plasma formed in a generator of the type shown in FIG. 1.

The conditions under which phosphate reduction took place were:

(1) Fluidizing argon rate=5.35 s.c.f.h. (standard cubic feed per hour)
(2) Carrier argon rate=5.35 s.c.f.h.
(3) Fluidized bed graphite=(135 grams minus 20 plus 65 mesh)
(4) Bed temperature=1030–1200° C.
(5) Vertical center electrode=tungsten ¼″ in diameter
(6) Duration=145 minutes
(7) Average feed rate=7.50 gms./minute
(8) Power input =1.10 kw.

The elemental phosphorus (P) was liberated by the reaction and was condensed from the effluent gases. The conversion of phosphate to elemental phosphorus was determined to be 43.1 percent.

EXAMPLE 2

Calcium carbide ($CaC_2$) was prepared from a commercial lime powder in a plasma generator similar to that illustrated in FIG. 3.

The composition of the lime was $CaO$—97.2%; $MgO$—1.18%; $Fe_2O_3$ plus $Al_2O_3$—0.47% and $SiO_2$—0.93%. The lime was a minus 20 plus 65 mesh. It was carried into the arc region in a carrier stream of argon gas. Calcium carbide was formed in the arc region.

The conditions of operation were:

(1) Fluidizing argon rate=5.35 s.c.f.h.
(2) Carrier argon rate=5.35 s.c.f.h.
(3) Fluidized bed=graphite (135 grams minus 20 plus 65 mesh)
(4) Vertical center electrode=tungsten ¼" in diameter
(5) Average feed rate=4.67 gms./minute
(6) Temperature in fluidized bed=1715° C.
(7) Duration=70 minutes
(8) Power input=2.99 kw.

At the termination of the run, agglomerates of the carbide-coated graphite particles were collected and analyzed to disclose a 24.6% conversion to $CaC_2$. Conversion of lime to $CaC_2$ can be improved by pre-mixing the lime with carbon and introducing the mixture into the plasma generator.

The above two examples demonstrate a typical use of this invention for conducting industrial chemical reactions.

The manufacturing of phosphorus and calcium carbide ($CaC_2$) by the process of this invention has not only demonstrated the use of this invention for conducting chemical reactions but has also revealed the usefulness of this invention for performing physical changes in substances. These physical changes include vaporizing, agglomerating, coating, spheroidizing, fusion, and solid phase transformation of materials.

These particular physical changes were noted in the above two manufacturing processes (P and $CaC_2$) from the following observations:

In the phosphorus example, a tungsten (W) cathode was used in the process under the conditions noted with the example. At the termination of the run it was observed that very fine particles of carbon had been deposited on the exhaust line of the apparatus used for the process of this invention. It was obvious that carbon had been vaporized when the very fine particles of carbon were found on the exhaust line.

At the end of the phosphorus run cited above, it was noted that the residual silica ($SiO_2$) particles were substantially larger than those silica particles which were fed into the arc generator. From this observation there was no doubt that agglomeration did result from this process.

In addition to the apparent agglomeration, the $SiO_2$ particles had the appearance of having been molten which indicates that fusion of $SiO_2$ had occurred as well as recrystallization.

The spherical shape of the examined $SiO_2$ particles confirms that spheroidization is a result that can be accomplished by the use of this invention.

In examining the products of the $CaC_2$ process, it was found that a $CaC_2$ coating had formed over a nucleus of carbon. The size of the $CaC_2$ coated particles was plus 35 mesh which was much larger than the CaO particles entering into the plasma arc generator. This signifies that the process of this invention is capable of being used for coating processes.

The melting and recrystallization of $SiO_2$ to form larger single crystals in the example for phosphorus production is evident that the process of this invention can be used for solid phase transformation of materials.

The critical features associated with this invention are determined by the substances in the fluidized bed. These critical features would include voltage-current relationships, the rate of fluidizing gas flow and the temperatures involved. It is obvious that these critical parameters would be different for producing elemental phosphorus than they would be for producing calcium carbide, hydrocyanic acid or some other substance. Each chemical system has its own characteristic values for these critical parameters.

Further examples of the present invention were demonstrated by the manufacture of acetylene from gaseous reactants. Acetylene was generated by exposing methane gas to a plasma-arc fluidized-bed apparatus such as that depicted by FIG. 4. Acetylene was also generated by exposing hydrogen gas and carbon to a plasma arc in such an apparatus.

The apparatus consisted of a 2-inch ID carbon tube vertically positioned to extend through an opening in the Pyrex dome of a stainless steel fluidized-bed reaction vessel. Provision was made for creating a fluidized bed in the bottom of the reactor. The lower portion of the tube extended well into the fluidized bed. A centrally located ½-inch graphite electrode extended into the reactor through the tube. The tube was enclosed at its top around the electrode and provision was made to introduce gas into the top of the tube. DC power connections were made so that the bed was the anode and the graphite electrode the cathode.

The reactor was operated by generating an arc in the vicinity of the end of the carbon tube while fluidizing with argon. Reactant gas was admitted through the carbon tube from the top and also through the bottom of the reactor. Carbon for reaction with hydrogen to form acetylene (where hydrogen was the reactant gas) came from the carbon particles of the fluidized bed. Arc stability was attained by using two Miller high-voltage DC power supplies. It was found that pure methane could be used without extinguishing the arc when 600 open circuit voltage was available at the power supply.

Acetylene was produce during multiple runs and varied from 0.2 percent for pure hydrogen gas feed to between 1 and 2 percent for pure methane feed. Table I below gives the results on an inert gas-free basis.

TABLE I.—MASS SPECTROGRAPH ANALYSES OF PLASMA-BED EFFLUENTS

| Component | Effluent gas composition, percent natural gas feed | Effluent gas composition, percent hydrogen |
| --- | --- | --- |
| Methane | 51.0 | |
| Hydrogen | 40.5 | 99.4 |
| Acetylene | 4.9 | 0.6 |
| Ethylene or ethane | 3.6 | |

The results shown in Table I using natural gas correspond to a feed rate of 0.7 s.c.f.m. argon and 0.15 s.c.f.m. natural gas and a power input of 8 kw.

During the run shown in Table I, 30 percent of the methane was cracked and 13.3 percent of theoretical conversion of methane to acetylene was achieved at specific power inputs of about 125-kw.-hr./lb. $C_2H_2$. These results are significant since over 50 percent of the methane was introduced through the bottom of the reactor along with the fluidizing gas and a major portion of this gas by-passed the arc zone. The portion of the gas that entered through the top of the carbon tube undoubtedly underwent a much higher rate of conversion to acetylene than the average reported above in Table I.

It will be understood that the embodiments of the drawings and the specific examples described above are illustrative only and that the claims are not limited to such specific devices and processes but are of a scope to include all operable modifications which are obvious from the description set forth in this specification.

What is claimed is:

1. In a method for generating a plasma arc the steps comprising:

(a) employing a gas phase to maintain a dense phase fluidized bed of electrically conductive particles within a fluidization vessel, (b) positioning an electrode contiguous to the dense phase fluidized bed, (c) establishing a continuous stable direct current plasma arc between the said electrode and the said conductive particles of the fluidized bed, (d) and maintaining the gas flow so that substantially no sparks or arcs occur within said bed.

2. A method for exposing materials to the high temperatures of a plasma arc and cooling the resulting heated products by intimate contact with a fluidized bed of particles comprising:

(a) establishing a fluidized bed of electrically conductive particles;

(b) positioning an electrode contiguous to said bed;

(c) establishing a continuous stable direct current electrical arc between said bed and said electrode while maintaining the gas flow so that substantially no sparks or arcs occur within said bed; and (d) introducing said materials into the high-temperature zone of said arc so that the resulting heated products pass from said zone into said fluidized bed.

3. A method for obtaining the heated products of at least one material exposed to the high-temperature zone of a plasma arc and cooled at lower temperatures in a fluidized bed of particles comprising:

(a) establishing a fluidized bed of electrically conductive particles in a vessel;

(b) positioning an electrode as extending into said vessel;

(c) providing a continuous stable direct current electrical potential between said bed and said electrode disposed to maintain an arc therebetween while maintaining the gas flow so that substantially no sparks or arcs occur within said bed;

(d) introducing said materials into the high-temperature zone of said arc so that the resulting heated products pass from said zone into said fluidized bed; and (e) removing heated products from said bed.

4. The method of claim 3 wherein said electrode is spaced from said fluidized bed.

5. The method of claim 3 wherein said electrode is vertically positioned.

6. The method of claim 3 wherein said electrode is introduced into said vessel at substantially the bottom thereof.

7. The method of claim 3 wherein said electrode is substantially vertically positioned and is contained in a surrounding tube that extends into said fluidized bed and said arc established below the upper level of said bed, said materials being introduced at least in part into said tube above said arc so as to flow down said tube around said electrode and into said bed.

References Cited

UNITED STATES PATENTS

| | | | |
|---|---|---|---|
| 2,731,410 | 1/1956 | Weir | 204—164 |
| 3,118,734 | 1/1964 | Miles et al. | 23—223 |
| 3,157,468 | 11/1964 | Kennedy et al. | 48—65 |
| 3,304,249 | 2/1967 | Katz | 204—164 |

FOREIGN PATENTS

| | | |
|---|---|---|
| 741,067 | 1/1955 | Great Britain. |

ROBERT K. MIHALEK, *Primary Examiner.*